Patented Oct. 14, 1924.

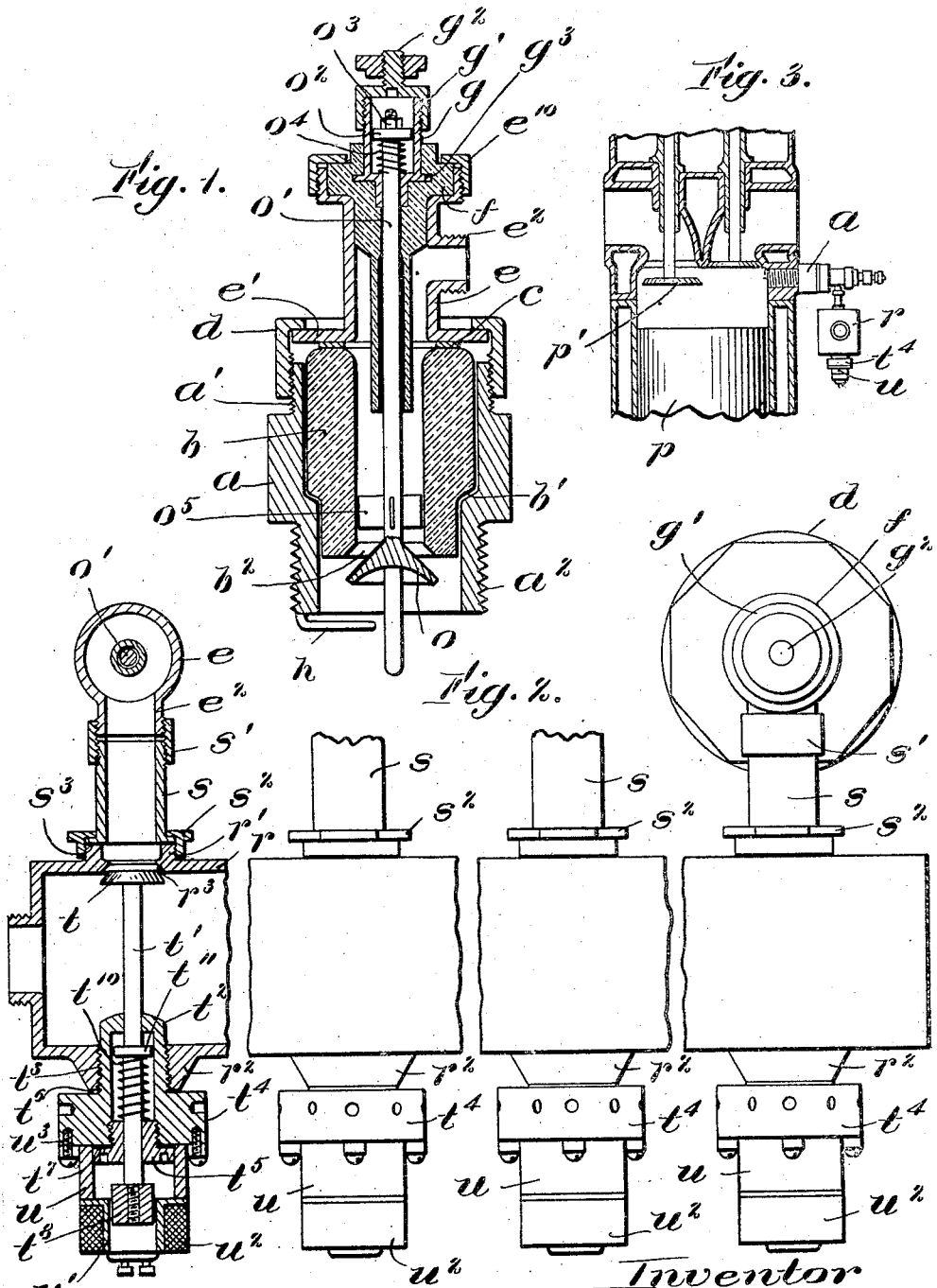

1,511,281

UNITED STATES PATENT OFFICE.

JOHN E. KENNEDY, OF GLENS FALLS, NEW YORK.

SCAVENGING DEVICE FOR MOTORS.

Application filed February 12, 1920. Serial No. 358,275.

*To all whom it may concern:*

Be it known that I, JOHN E. KENNEDY, British subject, and resident of Glens Falls, in the county of Warren and State of New York, have invented certain new and useful Improvements in Scavenging Devices for Motors, of which the following is a specification.

This invention relates to scavenging the cylinders of an internal combustion engine and is intended to provide simple, convenient and practical arrangement by means of which the waste or combustion gases may be thoroughly expelled from the clearance space in the cylinder which lies immediately adjacent to the cylinder head.

According to present practice, in a four cycle engine, after the explosion or power stroke, the piston forces out the combustion gases through the exhaust port on its return or exhaust stroke. Owing to the practical necessity of leaving a substantial clearance space next to the cylinder head, a considerable body of combustion gas remains trapped in this clearance space and mingles with the inrushing explosive charge of gas and air thus impoverishing the mixture.

According to the present invention this difficulty is overcome by providing a continuous supply of compressed air with proper means for controlling its admission into the cylinder so that preferably as each piston approaches the end of its exhaust stroke, fresh compressed air is admitted into the cylinder so as to sweep out the residuum of burnt gas that would otherwise be trapped in the clearance space, the fresh air taking the place in the clearance space and thus affording aid to combustion instead of tending to smother or retard it.

The invention is applicable to an engine having any type of exhaust valve whether sleeve-valve, poppet valve or otherwise. In the accompanying drawings I have shown a specific form of the invention in which the scavenging charge is admitted through the spark plug applied to a common type of valve in the head motor, but other applications of the principle may be made to meet varying conditions of engine practice.

In the drawings;

Figure 1 is an enlarged detail showing in longitudinal section a form of hollow spark plug employed as the compressed air conduit for conducting air into the cylinder.

Figure 2 is a side elevation partly in central section, showing the compressed air container or manifold with connection leading to the hollow spark plug.

Figure 3 is a detail showing a valve-in-the-head cylinder in central longitudinal section with the manifold and spark plug in operative position thereon.

In the practice of this invention according to the illustration of the drawings I provide a compressed air container or manifold $r$ which is preferably supported to extend on one side of the engine adjacent to the row of spark plugs $a$ and is held in position for connection with said spark plugs by any suitable type of support as indicated in Figure 3.

Where the inlet passage for the inflow of compressed air into the clearance space of the cylinder is made through the spark plug itself, as shown in the present illustration of the invention, the spark plug must of course have a special construction adapting it to that purpose, and I will now describe the details of construction of such a spark plug as illustrated in Figure 1 of the drawings.

In this case the spark plug embraces the usual tubular body portion $a$ whose lower end $a^2$ is externally screw threaded to be screwed tightly into the aperture formed in the upper end of the engine cylinder. It has also an upward extension $a'$ externally screw threaded to receive a coupling collar $d$ which serves the two-fold purpose of tightly securing the hollow cover member $e$ to the body of the spark plug and of forcing the insulating member $b$ shown in the form of a porcelain tube having an annular shoulder $b'$, to rest upon a corresponding shoulder in the interior of the body member $a$ so as to form a tight or non-leaking joint at this point. A packing ring or gasket $c$ is interposed between the lower flange $e'$ of the cover $e$ so as to tightly seal the joint at this point against leakage.

The cover or inlet member $e$ comprises a longitudinal tubular central portion whose upper end has an annular enlargement externally screw threaded to receive the binding collar $e^{10}$ which serves to force the porcelain plug $f$ firmly to its seat in the upper end of the cover member so as to afford suitable insulation between the electric conductor $o'$ and the surrounding metal parts of the spark plug. The porcelain plug $f$ is formed with a central recess in which is embedded a stuffing box or gland $g$ externally screw threaded at is upper end to receive a cap-like member $g'$ having a binding post extension $g^2$ which carries the usual binding nut for detaching the wire from the spark coil. This stuffing box has a retaining lateral flange $g^3$ to prevent any displacement of the stuffing box in relation to the porcelain plug under the influence of air pressure exerted inside the spark plug, and acts to prevent leakage around the extruded valve stem.

As it is desirable to prevent the combustion gases, under the pressure of the explosion, from backing up into the spark plug and compressed air chamber I prefer to employ a valve which normally closes the air passage through the spark plug to the cylinder. In this case I employ the check valve principle and I have shown a conical valve $o$ secured directly to a valve stem $o'$ which also forms an electrical conductor for the sparking current, the valve stem being continued below the valve to pass by the point of the opposing spark terminal $h$ secured to the threaded extension $a^2$ of the body member $a$. Convenient means may be employed for guiding or seating the combination valve stem and current conductor such as projecting wings or vanes $o^5$ bearing loosely against the inside wall of the insulation tube $b$.

The valve is normally kept seated against the tapered seat $b^2$ located at the bottom of the insulating member $b$ by means of a compressed spring $o^4$ bearing against a disk-like head $o^2$ which is secured in position by means of the nut $o^3$ on the upper end of the valve inside of the gland $g$. The gland is tightly closed against leakage by means of the screw threaded binding post cap $g'$. The insulating material of the upper insulating plug $f$ may be carried downward as far as may be desired to completely insulate the valve stem terminal $o'$ of the external metal parts.

The tubular cover is provided with a lateral nipple $e^2$ through which the spark plug is coupled to the short pipe $s$ by means of the reversely threaded coupling collar $s'$.

Any suitable means for connecting the manifold $r$ with the individual spark plugs may be employed. In the drawings I have shown a series of short connecting pipes $s$ having their upper ends threaded to receive a reversely threaded coupling $s'$ which on being turned draws the end of the pipe against an interposed gasket. The lower flanged end of pipe $s$ carries a coupling nut $s^2$ which has threaded engagement with the annular flange or nipple $r'$ to draw the latter snugly against a compressible gasket $s^3$. These connections may also serve as the means for supporting the manifold.

The port $r^3$ through which the air is admitted into the spark plug and hence to the cylinder, is normally closed by a valve $t$ whose valve stem $t'$ projects through a screw threaded gland or stuffing box $t^2$ which is screwed into the bottom of the nipple so as to compress the packing ring $t^6$ against the hollow boss $r^2$. Secured to the valve stem $t'$ at a proper location thereon, inside of the gland $t^2$, is a collar $t^{11}$ which receives the thrust of a compressed spring $t^{10}$ seated against a flanged spanner nut $t^5$ which is tapped into the lower end of the enlarged head $t^4$ of the gland $t^2$ so as to make a tight non-leaking joint between the flanged head of the nut $t^5$ and the flanged head $t^4$ of the gland.

Any suitable means may be employed for opening the valve from its valve seat to allow the passage of the compressed air into the cylinder. In this case, however, I have shown electrically actuated means for that purpose comprising a solenoid plunger $t^8$ secured to or forming an extension of the valve stem $t'$ and the surrounding solenoid coil $u^2$ supported by a suitable hollow carrier $u, u'$ which is secured directly to the enlarged head $t^4$ of the valve stem packing gland by means of screws $u^3$. To secure perfect alignment the nut $t^5$ is made in the form of a spanner nut with a circular head which forms a gaging or positioning member against the inside of the tubular bracket $u$ which supports the solenoid coil in position concentrically with the solenoid plunger $t^8$.

With the construction shown the entire valve stuffing box and solenoid may be removed from the manifold by simply unscrewing the gland $t^2$ whose head $t^4$ is provided with holes for a spanner wrench.

The operation of the device is as follows. When the piston $p$ of the cylinder has completed the greater part of its exhaust stroke with the exhaust valve $p'$ opened as shown in Figure 3, the solenoid $u^2$ is energized by any usual type of circuit closer such as the timing shaft of the engine so as to instantly draw down the plunger and connected valve stem $t'$ to open the valve $t$ to permit the inflow of the compressed air into the interior of the spark plug. The pressure of the inrushing air blast opens the check valve $o$ to allow the entrance of the air blast into the clearance space of the cylinder thus sweeping out through the open exhaust valve the combustion gases and filling the clearance space with fresh air. At substantially the same time that the intake valve of the cylinder opens, the solenoid $u^2$ is deenergized to allow the valve $t'$ to close the port $r^3$, the check valve $o$ being simultaneously closed at its compressed spring $o^4$. The valves $o$ and $t$ remain closed until the cycle has been completed and the piston is once more moving through its exhaust stroke.

The advantage of using the spark plug itself for the compressed air conduit is apparent since it involves no change in the engine construction itself as the engine is already provided with the spark plug opening located as here shown on the side of the cylinder or, as in some types of engine, on the top or head of the cylinder, but this advantage does not preclude the use of any other passage or conduit for leading the compressed air into the cylinder.

What I claim is:

1. In an internal combustion motor, the combination of a self-contained scavenging device for attachment to an internal combustion engine embracing in its construction a compressed air manifold chamber provided with outlet ports, a series of valves mounted in said manifold and normally acting under spring-pressure to close said outlet ports, valve actuating means connected with the stems of said valves, a series of hollow connecting members for detachably connecting said manifold with an individual cylinder of the motor to conduct air from the manifold to the individual cylinders when the valves are open, said connecting members being formed for connection with the spark plug openings in the respective cylinders, and having provision for supporting spark plugs in operative position in the respective cylinders, substantially as described.

2. In a motor cylinder scavenging device the combination of a compressed air chamber, a hollow spark plug secured in operative position in the cylinder and affording an inlet passage for the flow of compressed air into the cylinder, and means for automatically controlling the admission of compressed air through said spark plug into the cylinder, substantially as described.

3. In a motor cylinder scavenging device the combination of a compressed air container, a hollow spark plug secured in proper igniting position in the cylinder and having communication with the air chamber, a valve normally preventing the flow of compressed air through the spark plug into the cylinder, and means for opening said valve at predetermined intervals, substantially as described.

4. In a motor cylinder scavenging device the combination of a compressed air container, a hollow spark plug secured in operative position on the cylinder, a valve normally closing communication between the container and the cylinder through said spark plug, means for automatically opening said valve to admit compressed air into the cylinder, and a check valve arranged to prevent back pressure in the interior of the spark plug, substantially as described.

5. A scavenging spark plug having a tubular base constructed to be detachably secured to a motor cylinder, and an air-intake member detachably secured thereto by means of an interconnecting coupling, an internal electric conductor located inside said intake member and base and electrically insulated from both said members, the intake member being provided with an air-intake port in communication with an outlet port at the lower end of the base to conduct compressed air into the cylinder, substantially as described.

6. A scavenging spark plug for a motor cylinder embracing in combination a tubular supporting body member adapted to be secured to the motor cylinder, an air inlet member secured to said body member, an interior valve, a valve stem forming an electric spark terminal, means for normally closing said valve while allowing it to open to admit a compressed air charge through said inlet member, and means for insulating the valve stem from the inlet member, substantially as described.

7. A scavenging spark plug comprising a supporting tubular body member adapted to be secured to a motor cylinder, an insulating member held inside said body member and formed with an air passage to afford communication with the interior of the cylinder when the spark plug is attached, a cover having an air inlet port for leading compressed air to said passage, and an electrical conductor secured in and insulated from said cover and having an extension forming a spark terminal, substantially as described.

8. In a scavenging device for motor cylinders, the combination of a hollow spark plug provided with an internal air passage leading into the motor cylinder, a compressed air container having a valved port for admitting compressed air through said spark plug into the cylinder, a spring pressed valve normally closing said port, and having a valve stem projecting outside the container, coordinated mechanism for acting on said valve stem to open the valve on the exhaust stroke of the cylinder piston, substantially as described.

9. In a scavenging device for motor cylinders, the combination of a series of hollow valved spark plugs forming air passages into the interior of the respective motor cylinders, a compressed air manifold arranged adjacent to said spark plug and having ports communicating with the respective spark plugs, spring pressed valves normally closing said ports, a series of individual electric solenoids directly connected with the respective valves to open them when the different solenoid coils are energized, substantially as described.

In witness whereof, I have subscribed the above specification.

JOHN E. KENNEDY.